United States Patent
Verheyden et al.

[15] 3,687,931
[45] Aug. 29, 1972

[54] HALOGENATED PURINE AND PYRIMIDINE NUCLEOSIDES AND PROCESS THEREFOR

[72] Inventors: Julien P. Verheyden; John G. Moffatt, Los Altos, both of Calif.

[73] Assignee: Syntex Corporation, Panama, Panama

[22] Filed: March 19, 1970

[21] Appl. No.: 21,207

[52] U.S. Cl. ..........................260/211.5 R, 260/999
[51] Int. Cl. .......................C07d 51/52, C07d 51/54
[58] Field of Search ..............................260/211.5 R

[56] References Cited

UNITED STATES PATENTS

| | | |
|---|---|---|
| 3,155,646 | 11/1964 | Hunter................260/211.5 R |
| 3,282,921 | 11/1966 | Verheyden et al..260/211.5 R |
| 3,535,207 | 10/1970 | Shiro et al............260/211.5 R |
| 3,539,550 | 11/1970 | Greenberg et al. .260/211.5 R |

*Primary Examiner*—Lewis Gotts
*Assistant Examiner*—Johnnie R. Brown
*Attorney*—Evelyn K. Merker, Gerard A. Blaufarb and Walter H. Dreger

[57] ABSTRACT

Reacting suitably protected pyrimidine nucleoside and suitably protected purine nucleoside with triphenylphosphine and carbon tetrabromide or carbon tetrachloride in a dipolar aprotic solvent yields the corresponding 5'-deoxy-5'-halo nucleoside derivative. Reacting 5'-protected 2'-deoxy pyrimidine nucleoside in a similar fashion yields a mixture of the two possible isomeric 2', 3'-dideoxy-3'-halo-5'-protected pyrimidine nucleosides. Reacting 5'-protected uridine derivatives in a similar fashion yields the corresponding 2'-deoxy-2'-chloro derivative. These compounds and disclosed derivatives thereof have antibiotic properties and are useful in controlling metabolic processes.

32 Claims, No Drawings

HALOGENATED PURINE AND PYRIMIDINE NUCLEOSIDES AND PROCESS THEREFOR

This invention relates to halogenated purine and pyrimidine nucleosides and to processes for preparing these compounds using triphenylphosphine and carbon tetrabromide or carbon tetrachloride in a dipolar aprotic solvent.

The halogenated compounds of this invention can be represented by the following general formulas:

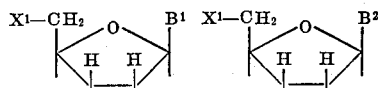

(A)                (B)

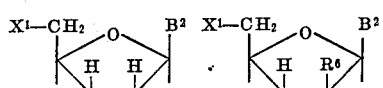

(C)                (D)

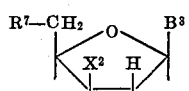

(E)

In the above formulas, each of $R^1$, $R^2$, $R^3$, $R^4$, $R^5$, and $R^6$ is hydroxy or a conventional hydrolyzable group;

$B^1$ is 5-azauracil, 5-azacytosine, a purine base or a conventional hydrolyzable acyl derivative thereof, but $B^1$ does not include adenin-9-yl, hydroxanthin-9-yl, or guanin-9-yl when each of $R^1$ and $R^2$ is hydroxy;

$B^2$ is a purine base or a conventional hydrolyzable acyl derivative thereof;

$B^3$ is a pyrimidine base or a conventional hydrolyzable acyl derivative thereof;

$R^7$ is bromo, chloro, hydroxy, or a conventional hydrolyzable group; and $X^1$ and $X^2$ each is bromo or chloro, but when $R^7$ is bromo or chloro then $X^2$ is bromo or chloro, respectively.

The process of this invention for producing compounds having the following general formulas:

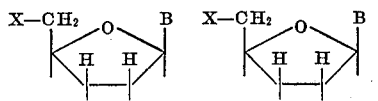

(F)                (G)

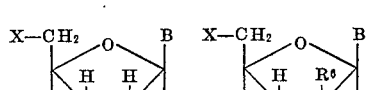

(H)                (I)

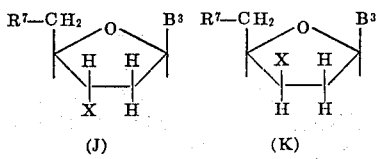

(J)                (K)

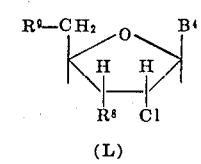

(L)

wherein each of $R^1$, $R^2$, $R^3$, $R^4$, $R^5$, $R^6$, $R^7$, and $B^3$ is as defined above;

$R^8$ is hydroxy or a conventional hydrolyzable group;

$R^9$ is chloro, hydroxy, or a conventional hydrolyzable group;

B is purine or pyrimidine base or a conventional hydrolyzable acyl derivative thereof, but B does not include adenin-9-yl, hydroxanthin-9-yl, or guanin-9-yl when each of $R^1$ and $R^2$ is hydroxy;

$B^4$ is a uracil base or a conventional hydrolyzable acyl derivative thereof; and each X is bromo or chloro but, in Formulas (J) and (K), when $R^7$ is bromo or chloro then X is bromo or chloro, respectively, which comprises reacting in a dipolar aprotic solvent a β-D-pentofuranosyl pyrimidine or β-D-pentofuranosyl purine, containing at least one free hydroxy group at the C-2', C-3', and C-5' positions in a dipolar aprotic solvent with triphenylphosphine and carbon tetrachloride, and optionally hydrolyzing the protecting groups of the reaction products.

The process of this invention for preparing compounds represented by Formulas (F), (G), (H), and (I) above comprises reacting the corresponding 5'-monohydroxy compound in the ribopentofuranosyl, 2'-deoxypentofuranosyl, 3'-deoxypentofuranosyl, and arabinopentofuranosyl series in a dipolar aprotic solvent with triphenylphosphine and carbon tetrabromide or carbon tetrachloride and optionally hydrolyzing the protecting group of the resulting 5'-deoxy-5'-halo product.

The process of this invention for producing compounds represented by Formulas (J) and (K) above comprises reacting the corresponding 5'-substituted 2'-deoxyerythropentofuranosyl compound or 2'-deoxyerythropentofuranosyl compound in a dipolar aprotic solvent with triphenylphosphine and carbon tetrabromide or carbon tetrachloride and optionally hydrolyzing the protecting group of the 2', 3'-dideoxy-3'-halothreopentofuranosyl, 2',3'-dideoxy-3'-haloerythropentofuranosyl, 3', 5'-dihalo-2', 3',5'-trideoxythreopentofuranosyl and 3',5'-dihalo-2', 3',5'-trideoxyerythropentofuranosyl products.

The process of this invention for preparing compounds represented by Formula (L) above comprises reacting the ribopentofuranosyl compound having optional protection at C-5' in a dipolar aprotic solvent with triphenylphosphine and carbon tetrachloride and optionally hydrolyzing the protecting group of the resulting 2'-deoxy-2'-chlororibopentofuranosyl product.

The process of the present invention provides for the replacement of a hydroxyl with bromine or chlorine determined by using carbon tetrabromide and carbon tetrachloride, respectively. In the preparation of the 5'-deoxy-5'-halo (halo being bromo or chloro) compounds in the pyrimidine series, starting compounds require no special protection in the uridine series. Starting compounds in the cytidine series require prior acylation of the amino group. However, free hydroxy groups are optionally prior protected. In the preferred embodiments, for example, 2', 3'-0-isopropylidene derivatives are used in the process of this invention.

Starting compounds in the purine series require prior protection of labile groups such as hydroxyl and amino. Conventional protective groups are employed which can be hydrolyzed after the principal reaction.

The process of the present invention is conducted by reacting together a nucleoside having one or more free hydroxy group, as described above, with triphenylphosphine and carbon tetrabromide or carbon tetrachloride in a dipolar aprotic solvent. Carbon tetrabromide affords replacement of the hydroxy with a bromine atom; carbon tetrachloride, replacement of hydroxy with a chlorine atom. Suitable dipolar aprotic solvents include dimethylformamide, diethylformamide, dimethylacetamide, N-methyl-2-pyrrolidone, and hexamethylphosphoric triamide.

The reaction is further conducted at temperatures ranging from about 10°C. to about 100°C. and for a period of time sufficient to complete reaction ranging from about 1 hour to about 6 days, depending on the temperature used.

In the practice of this process, the reactants are contacted and maintained in any convenient order or fashion preferably within the given temperature range. After the reaction, the product(s) is separated and isolated from the reaction mixture via conventional techniques such as evaporation, filtration, decantation, extraction, chromatography and the like.

The reaction consumes the reactants on the basis of one equivalent of triphenylphosphine per equivalent of carbon tetrabromide or carbon tetrachloride per equivalent of hydroxy group to be replaced by halogen- the primary hydroxy being replaced first and being replaced selectively depending on the length and temperature of the reaction and the excess of triphenylphosphine. However, the relative amounts of the reactants employed are not critical, some of the desired product being prepared when employing any proportions thereof. In the preferred embodiments, from 1.0 to about 1.5 equivalents of triphenylphosphine and from 1.0 to about 10 equivalents of carbon tetrabromide or -chloride are employed per equivalent of hydroxy group to be replaced by halogen, the dipolar aprotic solvent being employed in excess, solvent amounts.

The term "purine base" as used herein, refers to an unsubstituted or substituted purine, 7-deazapurine or 8-azapurine group wherein the point of attachment to the furanose unit is through the 9-position of the purine group. Thus the term "purine base" is inclusive of the nitrogen analogs, i.e. members of the 7-deazapurine, 8-azapurine, 2-azapurine and 8-aza-9-deazapurine series.

More specifically, the purine bases include adenin-9-yl, 7-deazaadenin-9-yl, 8-azaadenin-9-yl, 2-fluoroadenin-9-yl, 7-cyano-7-deazaadenin-9-yl, 2-azaadenin-9-yl, 8-aza-9-deazaadenin-9-yl, hypoxanthin-9-yl, 8-aza-9-deazahypoxanthin-9-yl, xanthin-9-yl, guanin-9-yl, 7-deazaguanin-9-yl, 2-thioguanin-9-yl, 8-azaguanin-9-yl, purin-9-yl, 6-chloropurin-9-yl, 6-mercaptorpurin-9-yl, 6-methylmercaptopurin-9-yl, 2,6-dichloropurin-9-yl, 2,6-diaminopurin-9-yl, 2,6-di(methylamino)purine-9-yl, 6-dimethylaminopurin-9-yl, 6-pyrolidinopurin-9-yl, 6-piperidinopurin-9-yl, 2-amino-6-methylmercaptopurin-9-yl, and so forth.

In the ribo and 2-deoxyribo series, preferred purine bases are those listed above. In the 3-deoxyribo series, preferred purine bases are those listed above exclusive of 7-cyano-7- deazaadenin-9-yl and 2-thioguanin-9-yl and inclusive of 6- bromopurin-9-yl, 6-methylaminopurin-9-yl, 2-amino-6-dimethylaminopurin-9-yl, 2-amino-6-methoxypurin-9-yl, 2-amino-6-benzylthiopurin-9-yl, and 2-amino-6-methylthiopurin-9-yl. In the arabino series, preferred purine bases are adenin-9-yl, hypoxanthin-9-yl, guanin-9-yl, and 6-mercaptopurin-9-yl.

The term "pyrimidine base" in the present context refers to an unsubstituted or substituted pyrimidine, 5-azapyrimidine, or 6-azapyrimidine wherein the point of attachment of the furanose unit is through the 1-position of the pyrimidine group. More specifically, the pyrimidine bases include uracil-1-yl, 5-fluorouracil-1-yl, 5-chlorouracil-1-yl, 5-bromouracil-1-yl, 5-iodouracil-1-yl, 5-trifluoromethyluracil-1-yl, 5-methylaminouracil-1-yl, 5-dimethylaminouracil-1-yl, 5-nitrouracil-1-yl, 6-azuracil-1-yl, 6-aza-5-methyluracilyl-yl cytosin-1-yl, fluorocytosin-1-yl, 5-chlorocytosin-1-yl, 5-bromocytosin-1-yl, 5-iodocytosin-1-yl, 5-methylcytosin-1-yl, 5-trifluoromethylcytosin-1-yl, 5-methylaminocytosin-1-yl, 5-dimethylaminocytosin-1-yl, 5-nitrocytosin-1-yl, 6-azacytosin-1-yl, 6-aza-5-methylcytosin-1-yl, and so forth. Also included as pyrimidine bases are, in the ribo series, 5-azauracil and 5-azacytosine. The term "uracil base" includes uracil-1-yl per se as well as the various substituted derivatives thereof as set forth above, such as 5-methyluracil-1-yl or thymin-1-yl.

The term "conventional hydrolyzable group", as used herein, refers to a hydrolyzable acyloxy group, a hydrolyzable acyl derivative, both as defined infra., an alkylidenedioxy group, trityloxy, or methoxytrityloxy. The terms "hydrolyzable acyloxy groups" and "-hydrolyzable acyl derivatives", as used herein refers to those esters and acyl derivatives conventionally employed in the nucleoside and nucleotide art, preferably those derived from carboxylic acids of one to 12 carbon atoms. Typical such carboxylic acids include acetic, propionic, butyric, valeric, isovaleric, hexanoyl, pentanoyl, octanoyl, nonanoyl, undecanoyl, lauroyl, benzoic, p-methoxybenzoic, p-nitrobenzoic, phenylacetic, phenylpropionic, o-,m-,p-methylbenzoic, β-cyclopentylpropionic, dihydrocinnamic and the like.

The compounds of this invention exhibit antimetabolic properties and are accordingly useful in producing metabolic deficiencies in biological systems, as for example, in the growth of various microorganisms and similar undesirable systems, including Streptococcus faecalis, Shigella farady, and Klebsiella pneumoniae.

They can be used in the same manner as described in U.S. Pat. No. 3,282,921, which discloses some of these compounds. They are also useful to inhibit certain fungal purine β-ribosidases as set forth for 5'-chloro-5'-deoxyadenine by Reese et al., Arch. Biochem and Biophysics 125, 175 (1968).

The halogenated products are optionally hydrolyzed so as to restore any hydroxy groups. This can be done, in the case of ether protecting groups, with a mineral or or organic acid, preferably an acetic acid or trifluoroacetic acid in water at a temperature of from 0° to 50° C., preferably about 25° C. for from 8 hours to 30 days, preferably for 8 hours to 24 hours and, for ester protecting groups, with an alkali metal base such as sodium or potassium hydroxide, a tertiary amino or sodium methylate in methanol at from 10° to about 60° C. preferably from 4 hours to about 24 hours. The base moiety can be deacylated in a lower alkanol solvent with concentrated aqueous ammonium hydroxide at a temperature of about 20° C. to the reflux temperature of the lower alcohol solvent, preferably at the lower temperatures, for a period of 15 minutes to 24 hours.

The acylated compounds of this invention can be prepared by conventional procedures from the corresponding free hydroxy or free amino compounds. Examples of suitable acylation procedures include reacting the free hydroxy compounds with the corresponding acid anhydride or acid chloride in a suitable organic solvent in the presence of a suitable base.

The starting hydroxy nucleosides are known compounds and can be prepared by known methods. Some are described in U.S. Pat. No. 3,282,921, French Pat. No. 1,402,909 and in Chemical Abstracts 63, 17100g and the references cited therein. The 2-deoxypurinyl starting compounds are described in U.S. Pat. Application Ser. No. 847,414, filed Aug. 4, 1969 by Russell Greenberg, and Moffatt. These 2-deoxy purinyl compounds are prepared therein by reacting a 9-(β-D-ribofuranosyl)-purine with a α-acyloxy acyl halide, such as α-acetoxyisobutyryl bromide, in an inert organic solvent, hydrolyzing the reaction products to yield the corresponding 9-(2-deoxy-2-halo-β-D-ribofuranosyl)-purine, and dehalogenating the latter by hydrogenolysis to yield the corresponding 9-(2-deoxy-β-D-ribofuranosyl)-purine product. The 3-deoxypurinyl compounds are prepared therein by reacting a 9-(β-D-ribofuranosyl)-purine with a 2-acyloxy acyl halide in an inert organic solvent to yield the corresponding 9-(2-0-acyloxy-3-deoxy-3-halo-β-D-xylofuranosyl)-purine, dehalogenating the product by hydrogenolysis, and deacylating the dehalogenated product by hydrolysis. See also Journal of Organic Chemistry 32,859 (1967), Netherlands Pat. No. 6507083, Chemical Abstracts 64, P19750 h, and J. Med. Chem. 8, 659 (1965) and the references cited therein.

The following examples illustrate the manner by which this invention can be practiced but it will be understood that they are not to be construed as limitations upon the overall scope thereof.

EXAMPLE 1

Uridine (1 mmole) is suspended in 10 ml. of acetone containing 2 ml. of 2,2-dimethoxypropane. PErchloric acid is added thereto until dissolution and the solution is stirred for one half hour. Concentrated ammonia is added to neutralize the solution and the resultant mixture is then evaporated to dryness and the product purified by chromatography to provide the 2',3'-0-isopropylideneuridine which can be recrystallized from methanol.

EXAMPLE 2

The procedure of Example 1 is repeated utilizing, in lieu of uridine, 5-fluorouridine, 5-chlorouridine, 5-bromouridine, 5-iodouridine, 5-trifluoromethyluridine, 5-methylaminouridine, 5-dimethylaminouridine, 5-nitrouridine, 5-azauridine, 6-azauridine, and 6-aza-5-methyluridine to prepare the corresponding 2',3'-0-isopropylidine substituted uridine products, i.e., 5-fluoro-2',3'-0-isopropylidineuridine 5-chloro-2',3'-0-isopropylidineuridine, and so forth.

EXAMPLE 3

The procedure of Example 1 is repeated employing, in lieu or uridine, cytosine, 5-fluorocytosine, 5-chlorocytosine, 5-bromocytosine, 5-iodocytosine, 5-methylcytosine, 5-trifluoromethylcytosine, 5-methylaminocytosine, 5-dimethylaminocytosine, 5-nitrocytosine, 5-azacytosine, 6-azacytosine, and 6-aza-5-methylcytosine to prepare the corresponding 2',3'-O-isopropylidene substituted cytosine products, i.e., 2',3'-O-isopropylidenecytosine, 5-fluoro-2',3'-0-isopropylidenecytosine, 5-chloro-2',3'-0-isopropylidenecytosine, and so forth.

The procedures of Examples 1,2 and 3 are repeated utilizing benzaldehyde and its dialkyl acetal and cyclohexanone and its dialkyl acetal in lieu of acetone and 2,2-dimethoxypropane to prepare the corresponding 2',3'-O-benzylidene and 2',3'-O-cyclohexylidene uridine, substituted uridine, cytosine, and substituted cytosine products, i.e., 2',3'-o-benzylideneuridine, 2',3'-O-cyclohexylideneuridine, 2',3'-O-benzylidene-5-fluorouridine, ...,2',3'-O-cyclohexylidene-5-azacytosine, and so forth.

EXAMPLE 4

A solution of 2',3'-0-isopropylideneuridine (8.8 g.) in a mixture of pyridine (60 ml.) and acetic anhydride (10ml) is kept for 18 hours at 20° C. Methanol is added under cooling and the solvents are evaporated. The resulting syrup containing 5'-0-acetyl-2',3'-0-isopyridineuridene is added to 90 percent formic acid (200 ml) and is left 24 hours at 20° C. The solvents are evaporated under vacuum and the resulting syrup is purified by chromatography over silica gel. The 5'-0-acetyluridine fraction is isolated and recrystallized from methanol and dichloromethane.

By repeating the procedure of Example 4 on the products of Examples 2 and 3, the corresponding 5'-0-acetyl substituted uridine and $O^{5'}$, $N^4$-diacetyl, cytosine and substituted cytosine products are prepared, i.e., 5'-0-acetyl-5-fluorouridine,..., $O^{5'}$, $N^4$-diacetyl-5-nitrocytosine, and so forth.

EXAMPLE 5

A solution of uridine (10mmoles), trityl chloride (10mmoles) is pyridine (25 ml.) is kept at 100° C. for 3 hours. The reaction mixture is cooled and 20 ml. of acetic anhydride is added. The reaction mixture is then allowed to stand for 20 hours at 20° C. and is then poured into water with vigorous stirring. The precipitate which forms is removed by filtration, dried and then dissolved in 25 ml. 90 percent formic acid. The resultant reaction mixture is left for 10 minutes at 20° C. and, after this time, is evaporated under reduced pressure. The residual syrup is leached with hot benzene. The remaining residue is then purified by chromatography to provide the 2',3'-di-O-acetyluridine which can be recrystallized from acetone and ether.

EXAMPLE 6

The procedure of Example 5 is repeated utilizing, in lieu of uridine, the substituted uridine, cytosine, and substituted cytosine starting compounds of Examples 2 and 3 to prepare the corresponding 2',3'-di-O-acetyl substituted uridine and $O^{2'}$, $O^{3'}$, $N^4$-triacetyl cytosine and substituted cytosine products, i.e., 2', 3'-di-o-acetyl-5-iodouridine, . . . , $O^{2'}$,$O^{3'}$,$N^4$-triacetyl-5-dimethylaminocytosine, and so forth.

The procedure of Example 5 is repeated utilizing, in lieu of uridine, a 2'-deoxy- and 3'-deoxyuridine, a 2'-deoxy- or 3'-deoxycytosine, or substituted uridine or cytosine as set forth in Examples 2 and 3 above, to prepare the corresponding 3'-O-acetyl-2'-deoxyuridine and substituted uridine, $O^{3'}$ $N^4$-diacetyl-2'-deoxycytosine, and substituted cytosine products and the corresponding 2'-O-acetyl-3'-deoxy-uridine and substituted uridine and $O^{2'}$, $N^4$-diacetyl-3'-deoxycytosine and substituted cytosine products.

The procedure of Example 5 is repeated utilizing, in lieu of uridine, the corresponding arabinofuranosyluridine, substituted uridine, cytosine, and substituted cytosine compounds otherwise corresponding to those set forth in Examples 2 and 3 above, to prepare the corresponding 2',3'-di-O-acetylarabinofuranosyluridine and substituted uridine and $O^{2'}$, $O^{3'}$, $N^4$-triacetylarabinofuranosyl cytosine and substituted cytosine products.

Example 7

To a stirred, refluxing solution of cytidine (2 mmoles) in 50 ml. of methanol is added 0.5 ml. of acetic anhydride. During the reflux period, five additional 0.5 ml. portions of acetic anhydride are made hourly. After the final addition, the resultant solution is refluxed for one additional hour. It is then cooled and concentrated under reduced pressure at 30° C. to about 10 ml. volume. Ether is added until the solution is faintly turbid and the mixture is left overnight at 5° C. The resultant crystals are removed by filtration and washed with ether to provide the $N^4$-acetylcytidine.

Example 8

The procedure of Example 7 is repeated utilizing the substituted cytosine compounds named in Example 3 above as well as the corresponding 2-deoxy derivatives thereof to prepare the corresponding $N^4$-acetyl substituted cytosine products, i.e., $N^4$-acetyl-5-bromocytidine, and so forth.

EXAMPLE 9

Adenosine (10 mmoles.) is dissolved in 25 ml. of pyridine and monomethoxytrityl chloride (12 mmoles.) dissolved in 25 ml. of pyridine is slowly added thereto. After the addition, the reaction mixture is left overnight at 20° C. and then benzoyl chloride (50 mmoles) is added. The reaction is allowed to procede at room temperature (20° C.) for 24 hours. After this time, the reaction mixture is poured over ice and the resultant mixture partitioned between ethyl acetate and water. The organic layer is separated, washed with sodium bicarbonate and water and the washed mixture than evaporated to dryness. The residue is dissolved in a minimum of ethyl acetate and precipitated with hexane. The precipitate is hydrolyzed in a mixture of dimethylformamide (50 ml.) and 50 ml. of 80 percent acetic acid at 20° C. for one hour. The solvents are removed under vacuum and the residue purified by chromatography. The purified material is crystallized from chloroform to provide the $N^1$, $N^6$, $O^{2'}$, $O^{3'}$-tetrabenzoyladenosine product.

EXAMPLE 10

The procedure of Example 9 is repeated utilizing, in lieu of adenosine, 9-($\beta$-D-arabinofuranosyl)-adenine, 9-($\beta$-D-arabinofuranosyl) hypoxanthine, 9-($\beta$-D-arabinofuranosyl)-guanine, 6-mercapto-9-($\beta$-D-arabinofuranosyl)-purine, 7-deazaadenine, 7-deaza-3'-deoxyadenine, 8-azaadenine, 2-fluoroadenine, 2'-deoxy-2-fluoroadenine, 3'-deoxy-2-fluoroadenine, 7-deaza-7-cyanoadenine, 7-deaza-2'-deoxy-7-cyanoadenine, 2-azaadenine, 8-aza-9-deazaadenine, 8-aza-9-deaza-2'-deoxyadenine, 8-aza-9-deaza-3'-deoxyadenine, hypoxanthine, 8-aza-9-deazahypoxanthine, xanthine, guanine, 7-deazaguanine, 2-thioguanine, 8-azaguanine, purine, 6-chloropurine, 6-chloro-2'-deoxypurine, 6-chloro-3'-deoxypurine, 6-mercaptopurine, 6-methylmercaptopurine, 2,6-dichloropurine, 2'-deoxy-2,6-dichloropurine, 3'-deoxy-2,6-dichloropurine, 2,6-diaminopurine, 2,6-di(dimethylamino)purine, 6-dimethylaminopurine, 6-piperidinopurine, and 2-amino-6-methylmercaptopurine to provide the corresponding perbenzoylpurine compounds.

EXAMPLE 11

To a solution of 2',3'-O-isopropylideneuridine (3 mmoles) and triphenylphosphine (3mmoles) in 30 ml. of dimethylformamide are added 3.3 mmoles of carbon tetrachloride. The resultant reaction mixture is allowed to stand for 24 hours at 20°C. It is then quenched by the addition of methanol. The solvents are evaporated to dryness and the resulting crude syrup is purified by preparative thin layer chromatography (carbon tetrachloride:acetone; 6:4) to provide the 5'-chloro-5'-deoxy-2',3'-O-isopropylideneuridine which can be recrystallized from chloroform:n-hexane.

By substituting carbon tetrabromide for carbon tetrachloride in the above procedure the corresponding 5'-bromo-5'-deoxy-2',3'-O-isopropylideneuridine product is obtained.

EXAMPLE 12

The procedure of Example 11 is repeated utilizing, in lieu of 2',3'-O-isopropylideneuridine, the products of Examples 2, 3, and 5 to 10, to prepare the corresponding 5'-deoxy-5'-halopentofuranosyl pyrimidine and purine products, i.e., 5'-chloro-5'-deoxy-5-fluoro-2',3'-O-isopropylideneuridine, 5'-bromo-5'-deoxy-2',3'-O-isopropylidenecytosine, 5'-chloro-5'-deoxy-2',3'-O-benzylidenecytosine, 5'-bromo-5'-deoxy-2',3'-di-O-acetyluridine, 5'-chloro-5'-deoxy-O$^{2'}$, O$^{3'}$, N$^4$-triacetylcytosine, 5'-chloro-5'-deoxy-N$^4$-acetyl-5-azacytosine, 5'-bromo-5'-deoxy-N$^4$-acetyl-5-azacytosine, 5'chloro-5'-deoxy-N$^4$-acetyl-6-azacytosine, 5'-bromo-5'-deoxy-N$^4$-acetyl-6-azacytosine, N$^4$-acetyl-5'-chloro-5'-deoxy-5-fluorocytosine, N$^4$-acetyl-5'-bromo-5'-deoxy-5-fluorocytosine, N$^4$-acetyl-5'-chloro-2',5'-dideoxy-5-fluorocytosine, N$^4$-acetyl-5'-bromo-2',5'-dideoxy-5-fluorocytosine, N$^4$-acetyl-5'-chloro-5'-deoxy-5-iodocytosine, N$^4$-acetyl-5'-bromo-5'deoxy-5-iodocytosine, N$^4$-acetyl-5'-chloro-2',5'-dideoxy-5-iodocytosine, N$^4$-acetyl-5'-bromo-2',5'-dideoxy-5-iodocytosine N$^4$-acetyl-5'-chloro-5'-deoxy-5-trifluoromethylcytosine, N$^4$-acetyl-5'-bromo-5'-deoxy-5-trifluoromethylcytosine, N$^4$-acetyl-5'-chloro-2',5'-dideoxy-5-trifluoromethylcytosine, N$^4$-acetyl-5'-bromo-2',5'-dideoxy-5-trifluoromethylcytosine, 5'-chloro-2',5'-dideoxy-N$^1$, N$^6$, O$^{3'}$-tribenzoyladenosine, 5'-chloro-2',5'-dideoxy-2-fluoro-N$^1$,N$^6$, O$^{3'}$-tribenzoyladenosine, 5'-chloro-3',5'-dideoxy-2-fluoro-N$^1$, N$^6$, O$^{2'}$-tribenzoyladenine, 5',6-dichloro-2',5'-dideoxy-N$^1$, N$^6$, O$^{3'}$-tribenzoylpurine, 3',5'-dideoxy-N$^1$,N$^6$, O$^{2'}$-tribenzoyl-2,5',6-trichloropurine, and so forth.

EXAMPLE 13

A solution of uridine (1 mmole), triphenylphosphine (1 mmole) and carbon tetrachloride (1 mmole) in 5 ml. of dimethylformamide is allowed to stand at 20° C. for 24 hours. The reaction is monitored by thin layer chromatography and, if not complete, more triphenylphosphine and carbon tetrachloride are added and the reaction is continued at 20° C. for an additional 24 hour period. Thereafter, the reaction is quenched by the addition of methanol, the solvents are evaporated and the residue is purified by preparative thin layer chromatography (chloroform:methanol ; 85:15) to provide the 5'-chloro-5'-deoxyuridine product which can be recrystallized from methanol.

The above procedure is repeated using carbon tetrabromide in lieu of carbon tetrachloride to prepare the 5'-bromo-5'-deoxyuridine product.

EXAMPLE 14

The procedure of Example 13 is repeated utilizing, in lieu of uridine, the pyrimidine and purine products prepared as described in Examples 7 and 8 above to prepare the corresponding 5'-chloro-5'-deoxy and 5'-bromo-5'-deoxypyrimidine and purine products.

The procedure of Example 13 is repeated upon the starting compounds of Example 2, that is, the 2', 3'-unprotected uridine compounds to prepare the corresponding 5'-chloro-5'-deoxy and 5'-bromo-5'-deoxy uridine products, for example 5'-chloro-5'-deoxy-5-fluorouridine, 5'-bromo-5'-deoxy-5-fluorouridine, 5'-chloro-2',5'-dideoxy-5-fluorouridine, 5'-bromo-2',5'-dideoxy-5-fluorouridine, 5'-chloro-5'-deoxy-5-iodouridine, 5'-bromo-5'-deoxy-5-iodouridine, 5'-chloro-2',5'-dideoxy-5-iodouridine, 5'-bromo-2',5'-dideoxy-5-iodouridine, 5'-chloro-5'-deoxy-5-trifluoromethyluridine, 5'-bromo-5'-deoxy-5-trifluoromethyluridine, 5'5'-chloro-2',5'-dideoxy-5-trifluoromethyluridine, 5'-bromo-2',5'-dideoxy-5-trifluoromethyluridine, 5'-chloro-5'-deoxy-5-azauridine, 5'-bromo-5'-deoxy-5-azauridine.

EXAMPLE 15

A solution of 5'-O-tritylthymidine (4 mmole), triphenylphosphine (4 mmoles) and carbon tetrachloride (8 mmoles) in 10 ml. of diethylformamide is allowed to stand at 20° C. for 24 hours. The reaction is then quenched by the addition of methanol and the resultant mixture evaporated to dryness with the residue being chromatographed on preparative thin layer chromatography (methylene chloride:ethyl acetate; 6:4) to provide the 3'-chloro-3'-deoxy-5'-O-tritylthymidine product which can be further purified by preparative thin layer chromatography (carbon tetrachloride:acetone; 2:1) and by recrystallization. Also obtained is 1-(3'-chloro-2',3'-dideoxy-5'-O-trityl-β-D-threopentofuranosyl)-thymine which can be further purified by preparative thin layer chromatography (carbon tetrachloride:acetate; 2:1) and by recrystallization.

In like manner, the above procedure can be performed utilizing carbon tetrabromide in lieu of carbon tetrachloride to prepare the respective 3'-bromo-3'-deoxy-5'-O-tritylthymidine and 1-(3'-bromo-2',3'-dideoxy-5'-O-trityl-β-D-threopentofuranosyl -thymine products.

Hydrolysis provides, 1-(3'-chloro-2',3'-dideoxy-β-D-threopentofuranosyl)-thymine, 1-(3'-bromo-2',3'-dideoxy-β-D-threopentofuranosyl)-thymine, 3'-chloro-3'-deoxythymidine, and 3'-bromo-3'-deoxythymidine. Likewise prepared are 1-(3'-chloro-2',3'-dideoxy-β-D-threopentofuranosyl)-uracil, 1-(3'-bromo-2',3'-dideoxy-β-D-threopentofuranosyl)-uracil, 1-(3'-chloro-2',3'-dideoxy-β-D-threopentofuranosyl)-5-fluorouracil, 1-(3'-bromo-2',3'-dideoxy-β-D-threopentofuranosyl)-5-fluorouracil, 1-(3'-bromo-2',3'-dideoxy-β-D-threopentofuranosyl)-5-iodouracil, 1-(3'-chloro-2',3'-dideoxy-β-D-threopentofuranosyl)-5-iodouracil, 1-(3'-bromo-2',3'-dideoxy-β-D-threopentofuranosyl)-5-nitrouracil, 1-(3'-chloro-2',3'-dideoxy-β-D-threopentofuranosyl)-5-nitrouracil, 1-(3'-chloro-2',3'-dideoxy-β-D-threopentofuranosyl)-5-trifluoromethyluracil, and 1-(3'-bromo-2',3'-dideoxy-β-D-threopentofuranosyl)-5-trifluoromethyluracil.

EXAMPLE 16

The procedure of Example 15 is repeated on thymidine with 2 equivalents each of triphenylphosphine and carbon tetrachloride or tetrabromide to provide the following products:

3',5'-dichloro-3',5'-dideoxythymidine, 1-(3',5'-dichloro-2',3',5'-trideoxy-β-D-threopentofuranosyl)-thymine, 3',5'-dibromo-3',5'-dideoxythymidine, 1-(3',5'-dibromo-2',3',5'-trideoxy-β-D-threopentofuranosyl)-thymine.

EXAMPLE 17

A solution of uridine (2 mmoles), triphenylphosphine (6 mmoles) and carbon tetrachloride (10m- moles) in 10 ml. -dichloro-2' of dimethylformamide is allowed to stand at 20°C. for 5 days. The reaction mixture is then quenched by the addition of methanol and the solvents are evaporated. The residue is purified by preparative thin layer chromatography (chloroform:methanol; 9:1) to provide the 2',5'-dichloro- 2',5'-dideoxyuridine and the 5'-chloro-5'-deoxyuridine products which can be respectively crystallized from ethanol, chloroform, n-hexane, and ethanol.

EXAMPLE 18

A solution of 5'-O-acetyluridine (1 mmole), triphenylphosphine (3 mmole) and carbon tetrachloride (6 mmoles) in 5 ml. of dimethylformamide is left at 20°C. for 6 days. Methanol is added to quench the reaction and the solvents are evaporated to provide a residue which is purified by preparative thin layer chromatography (acetone:ethyl acetate; 1:1) to provide a compound which is deacylated in the presence of sodium methoxide and methanol. This solution is neutralized with Dowex 50+, the ion exchange resin is filtered, and the filtrate evaporated to provide the 2'-chloro-2'-deoxyuridine product which can be recrystallized from ethanol.

EXAMPLE 19

The procedure of Example 18 is repeated with the products prepared in Example 4 to provide the corresponding 2'-chloro-2'-deoxy substituted uridine and cytosine products.

EXAMPLE 20

The procedures of Examples 11, 13, 15, 17 and 18 are repeated employing dimethylacetamide in lieu of dimethylformamide or diethylformamide, with similar results.

EXAMPLE 21

The procedures of Examples 11, 13, 15, 17 and 18 are repeated employing hexamethylphosphorus triamide in lieu of dimethylformamide or diethylformamide with similar results.

EXAMPLE 22

The procedures of Examples 11, 13, 15, 17 and 18 are repeated employing acetonitrile in lieu of dimethylformamide or diethylformamide, with similar results.

EXAMPLE 23

The procedures of Examples 11, 13, 15, 17 and 18 are repeated using dimethylacetamide together with dimethylformmaide or diethylformamide, with similar results.

EXAMPLE 24

The N⁴-acetyl products of Example 12 are deacylated in the presence of ammonium hydroxide and methanol (24 hours at 20° C.) to provide the corresponding deacylated compounds, i.e., 5-aza-5'-chloro-5'-deoxycytosine, 5-aza-5'-bromo-5'-deoxycytosine, 6-aza-5'-chloro-5'-deoxycytosine, 6-aza-5'-bromo-5'-deoxycytosine, 6-chloro-9-(5-chloro-5-deoxy-β-D-ribofuranosyl)-purine, 5'-chloro-5'-deoxyadenosine, 5'-bromo-5'-deoxyadenosine, 5'-chloro-5'-deoxy-5-fluorocytosine, 5'-bromo-5'-deoxy-5-fluorocytosine, 5'-chloro-2',5'-dideoxy-5'fluorocytosine, 5'-bromo-2',5'-dideoxy-5-fluorocytosine, 5'-chloro-5'-deoxy-5-iodocytosine, 5'-bromo-5'-deoxy-5-iodocytosine, 5'-chloro-2',5'-dideoxy-5-iodocytosine, 5'-bromo-2',5'-dideoxy-5-iodocytosine, 5'-chloro-5'-deoxy-5-trifluoromethylcytosine, 5'-bromo-5'-deoxy-5-trifluoromethylcytosine, 5'-chloro-2',5'-dideoxy-5-trifluoromethylcytosine, 5'-bromo-2',5'-dideoxy-5-trifluoro-methylcytosine, 5'-chloro-5'-deoxy-6-mercapto-9-(β-D-arabinofuranosyl)-purine, 5'-bromo-5'-deoxy-6-mercapto-9-(β-D-arabinofuranosyl)-purine, 5'-chloro-7-deaza-3',5'-dideoxy-adenine, 5'-bromo-7-deaza-3',5'-dideoxyadenine, 5'-chloro-3',5'-dideoxy-2-fluoroadenine, 5'-bromo-3',5'-dideoxy-2-fluoroadenine, 8-aza-5'-chloro-9-deaza-3',5'-dideoxyadenine, 8-aza-5'-bromo-9-deaza-3',5'-dideoxyadenine, 5',6-dichloro- 3'5'-dideoxypurine, 5'-bromo-6-chloro-3',5'-dideoxypurine, 3'5'-dideoxy-2,5',6-trichloropurine, 5'-bromo-2,6-dichloro-3',5'-dideoxypurine, 5',6-dichloro-2',5'-dideoxypurine, 5'-bromo-6-chloro-2',5'-dideoxypurine, 2',5'-dideoxy-2,5',6-trichloropurine, 5'-bromo-2,6-dichloro-2',5'-dideoxypurine, 5'-chloro-2',5'-dideoxy-2-fluoroadenine, 5'-bromo-2',5'-dideoxy-2-fluoroadenine, 5'-chloro-7-deaza-2',5'-dideoxyadenine, 5'-bromo-7-deaza-2',5'-dideoxyadenine, 8-aza-5'-chloro-9-deaza-2',5'-dideoxyadenine, 8-aza-5'-bromo-9-deaza-2',5'-dideoxyadenine, 5'-chloro-5'-deoxy-2-fluoroadenine, 5'-bromo-5'-deoxy-2-fluoroadenine, 5'-chloro-7-cyano-7-deaza-5'-deoxyadenine, 5'-bromo-7-cyano-7-deaza-5'-deoxyadenine, 8-aza-5'-chloro-9-deaza-5'-deoxyadenine, 8-aza-5'-bromo-9-deaza-5'-deoxyadenine, 5'-deoxy-5',6-dichloropurine, 5'-bromo-6-chloro-5'-deoxypurine, 5'-deoxy-2,5',6-trichloropurine, 5'-bromo-5'-deoxy-2,6-dichloropurine, and so forth.

EXAMPLE 25

The products of Examples 11, 12, and 15 are hydrolyzed with formic acid (24 hours at 20° C.) to provide the corresponding unprotected products, i.e., 5'-chloro-5'-deoxyuridine, 5'- bromo-5' -deoxyuridine, 5'-chloro-5'-deoxy-5-fluorouridine, . . ., 3'-chloro-3'-deoxythymidine, and so forth.

What is claimed is:

1. A compound selected from those represented by the following formulas:

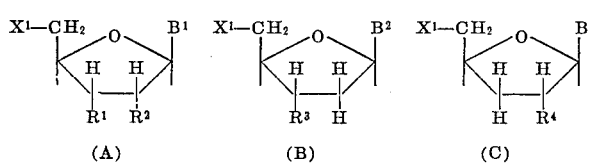

(A)  (B)  (C)

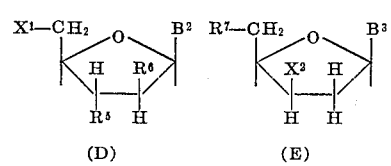

(D)  (E)

wherein,
each of $R^1$, $R^2$, $R^3$, $R^4$, $R^5$, and $R^6$ is hydroxy, carboxylic acyloxy group of one to 12 carbon atoms, carboxylic acyl group of one to 12 carbon atoms, alkylidenedioxy, trityloxy, or methoxytrityloxy;

$B^1$ is a purine base or a carboxylic acyl group of 1 to 12 carbon atoms thereof, but $B^1$ does not include adenin-9-yl, hydroxanthin-9-yl, or guanin-9-yl when each of $R^1$ and $R^2$ is hydroxy;

$B^2$ is a purine base or a carboxylic acyl group of one to 12 carbon atoms thereof;

$B^3$ is a pyrimidine base or a carboxylic acyl group of one to 12 carbon atoms thereof;

$R^7$ is bromo, chloro, hydroxy, carboxylic acyloxy group of one to 12 carbon atoms, carboxylic acyl group of one to 12 carbon atoms, alkylidenedioxy, trityloxy, or methoxytrityloxy; and $X^1$ and $X^2$ each is bromo or chloro, but when $R^7$ is bromo or chloro then $X^2$ is bromo or chloro, respectively.

2. The compound of claim 1 selected from those represented by Formula (A) wherein each of $R^1$ and $R^2$ is hydroxy.

3. The compound of claim 2 selected from those wherein $B^1$ is 2-fluoroadenin-9-yl.

4. The compound of claim 2 selected from those wherein $B^1$ is 7-cyano-7-deazaadenin-9-yl.

5. The compound of claim 2 selected from those wherein $B^1$ is 8-aza-9-deazaadenin-9-yl.

6. The compound of claim 2 selected from those wherein $B^1$ is 6-chloropurin-9-yl.

7. The compound of claim 2 selected from those wherein $B^1$ is 2,6-dichloropurin-9-yl.

8. The compound of claim 1 selected from those represented by Formula (B) wherein $R^3$ is hydroxy.

9. The compound of claim 8 selected from those wherein $B^2$ is 2-fluoroadenin-9-yl.

10. The compound of claim 8 selected from those wherein $B^2$ is 7-cyano-7-deazaadenin-9-yl.

11. The compound of claim 8 selected from those wherein $B^2$ is 6-chloropurin-9-yl.

12. The compound of claim 8 selected from those wherein $B^2$ is 2,6-dichloropurin-9-yl.

13. The compound of claim 1 selected from those represented by Formula (C) wherein $R^4$ is hydroxy.

14. The compound of claim 13 selected from those wherein $B^2$ is 7-deazaadenin-9-yl.

15. The compound of claim 13 selected from those wherein $B^2$ is 2-fluoroadenin-9-yl.

16. The compound of claim 13 selected from those wherein $8^2$ is 8-aza-9-deazaadenin-9-yl.

17. The compound of claim 13 selected from those wherein $B^2$ is 6-chloropurin-9-yl.

18. The compound of claim 13 selected from those wherein $B^2$ is 2,6-dichloropurin-9-yl.

19. The compound of claim 1 selected from those represented by Formula (D) wherein each of $R^5$ and $R^6$ is hydroxy and $B^2$ is 6-mercaptopurin-9-yl.

20. The compound of claim 1 selected from those represented by Formula (E) wherein $R^7$ is hydroxy.

21. The compound of claim 20 selected from those wherein $B^3$ is uracil-1-yl or thymin-1-yl.

22. The compound of claim 20 selected from those wherein $B^3$ is 5-fluorouracil-1-yl.

23. The compound of claim 20 selected from those wherein $B^3$ is 5-ioduracil-1-yl.

24. The compound of claim 20 selected from those wherein $B^3$ is 5-nitrouracil-1-yl.

25. The compound of claim 20 selected from those wherein $B^3$ is 5-trifluoromethyluracil-1-yl.

26. The process for producing compounds selected from those represented by the following formulas:

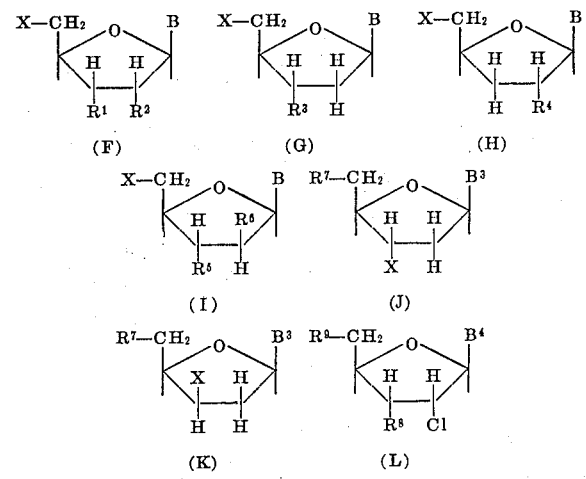

wherein,
each of $R^1$, $R^2$, $R^3$, $R^4$, $R^5$, and $R^6$ is hydroxy, carboxylic acyloxy group of one to 12 carbon atoms, carboxylic acyl group of one to 12 carbon atoms, alkylidenedioxy, trityloxy, or methoxytrityloxy;

$R^7$ is bromo, chloro, hydroxy, carboxylic acyloxy group of one to 12 carbon atoms, carboxylic acyl group of one to 12 carbon atoms, alkylidenedioxy, trityloxy, or methoxytrityloxy;

$R^8$ is hydroxy, carboxylic acyloxy group of one to 12 carbon atoms, carboxylic acyl group of one to 12 carbon atoms, alkylidenedioxy, trityloxy, or methoxytrityloxy;

$R^9$ is chloro, hydroxy, carboxylic acyloxy group of one to 12 carbon atom, carboxylic acyl group of one to 12 carbon atoms, alkylidenedioxy, trityloxy, or methoxytrityloxy;

B is purine or pyrimidine base or a carboxylic acyl group of one to 12 carbon atoms thereof, but B does not include adenin-9-yl, hydroxanthin-9-yl, or guanin-9-yl when each of $R^1$ and $R^2$ is hydroxy;

$B^3$ is a pyrimidine base or a carboxylic acyl group of one to 12 carbon atoms thereof;

$B^4$ is a uracil base or a carboxylic acyl group of one to 12 carbon atoms thereof;

each of X is bromo or chloro but, in Formulas (J) and (K), when $R^7$ is bromo or chloro then X is bromo or chloro, respectively, which comprises reacting a β-D-pentofuranosyl pyrimidine or β-D-pentofurnaosyl purine, containing at least one free hydroxy group at the C—2', C—3', and C—5' positions in a dipolar aprotic solvent with triphenylphosphine and carbon tetrabromide or carbon tetrachloride, and optionally hydrolyzing the protecting groups of the reaction products.

27. The process of claim 26 for producing compounds selected from those represented by Formulas (F), (G), (H), and (I) wherein there is reacted a 5'-monohydroxy starting compound in the ribopentofuranosyl, 2'-deoxypentofuranosyl, 3'-deoxypentofuranosyl, and arabinopentofuranosyl series to prepare the corresponding 5'-deoxy-5'-halo product.

28. The process of claim 26 for producing compounds selected from those represented by Formulas (J) and (K) wherein there is reacted a 3'-monohydroxy-2'-deoxyerythropentofuranosyl or 3',5'-dihydroxy-2'-deoxyerythropentofuranosyl starting compound to prepare the corresponding 2',3'dideoxy-3'-halothreopentofurnaosyl, 2',3'-dideoxy-3'-haloerythropentofuranosyl, 3',5'-dihalo-2',3',5'-trideoxythreopentofuranosyl and 3',5'-dihalo-2',3',5'-trideoxyerythropentofuranosyl products.

29. The process of claim 26 for producing compounds selected from those represented by Formula (L) wherein there is reacted a ribopentofuranosyl starting compound having optional protection at C—5' to prepare the corresponding 2'-deoxy-2'-chlororibopentofuranosyl product.

30. The process of claim 26 conducted at from 10° to 100° C.

31. The process of claim 26 wherein the dipolar aprotic solvent is dimethylformamide.

32. The process of claim 26 wherein 5'-chloro-5'-deoxyadenosine is prepared.

* * * * *